(No Model.)

B. J. CURRY.

CULTIVATOR.

No. 299,627. Patented June 3, 1884.

Attest:
F. H. Schott
A. R. Brown.

Inventor:
Bunnell J. Curry
per J. L. Parker
Atty.

(No Model.) 2 Sheets—Sheet 2.

B. J. CURRY.
CULTIVATOR.

No. 299,627. Patented June 3, 1884.

Attest:
F. H. Schott
A. R. Brown.

Inventor:
Burnell J. Curry
per J. C. Tasker
Atty.

UNITED STATES PATENT OFFICE.

BURWELL J. CURRY, OF HUNTSVILLE, ALABAMA.

CULTIVATOR.

SPECIFICATION forming part of Letters Patent No. 299,627, dated June 3, 1884.

Application filed December 15, 1883. (No model.)

*To all whom it may concern:*

Be it known that I, BURWELL J. CURRY, a citizen of the United States, residing at Huntsville, in the county of Madison and State of Alabama, have invented certain new and useful Improvements in Cultivators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to machines for cultivating and chopping cotton, peas, beans, sorghum, and other plants grown in furrows. The machine consists of a rectangular frame mounted upon wheels, and provided with supporting devices for the cultivator shanks or stocks, that are adjustably connected to suitable shafts in such a manner as to be raised and lowered with great facility.

The invention consists in the construction and arrangement of parts, as hereinafter more fully described and claimed.

Figure 1:
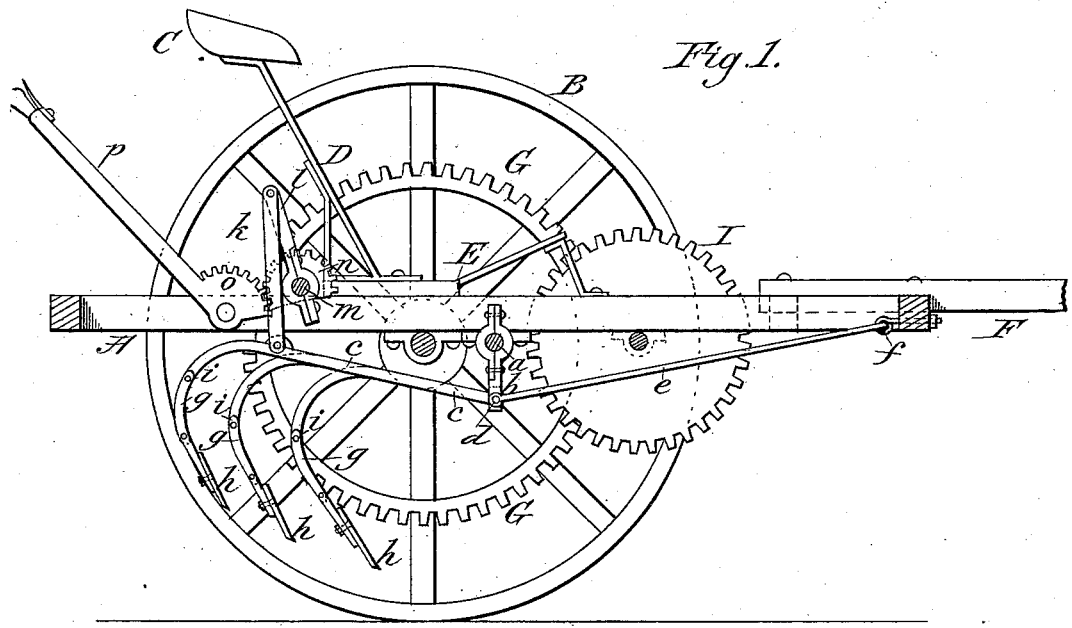
Figure 2:
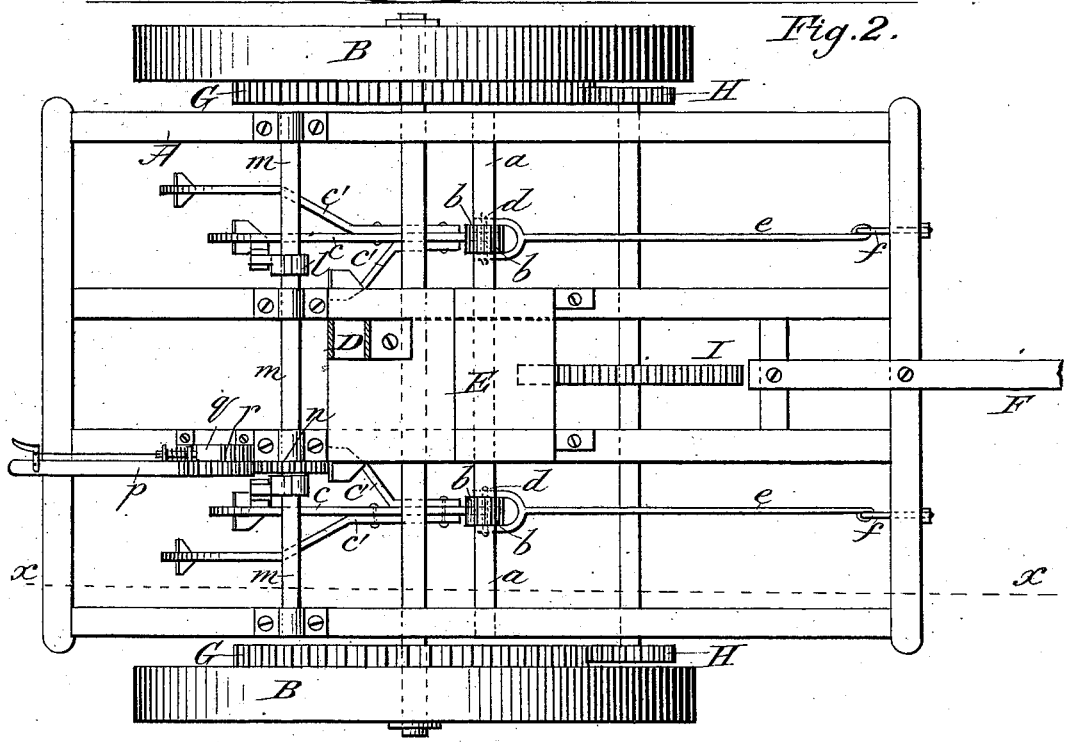
Figure 3:
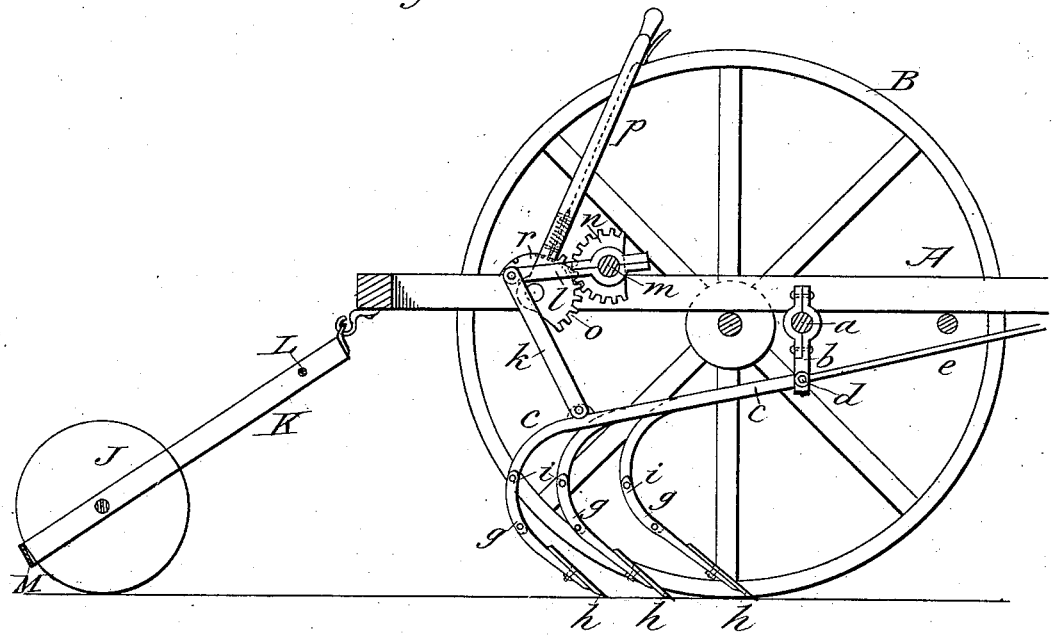
Figure 4:
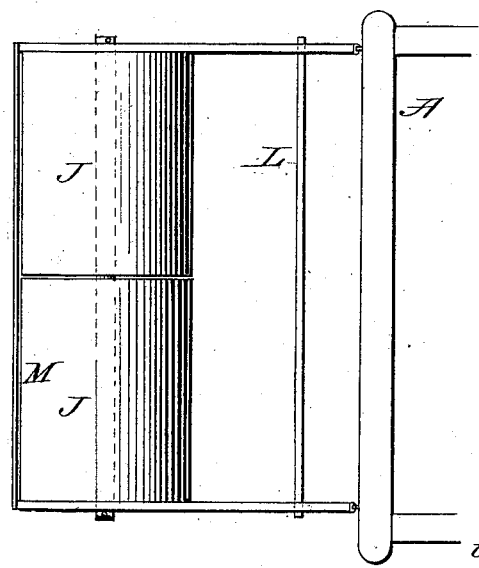
Figure 5:
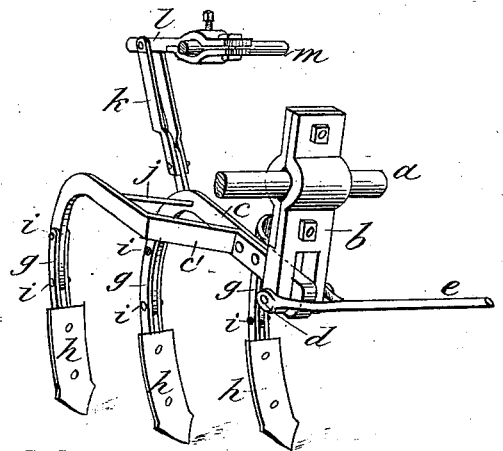
Figure 6:
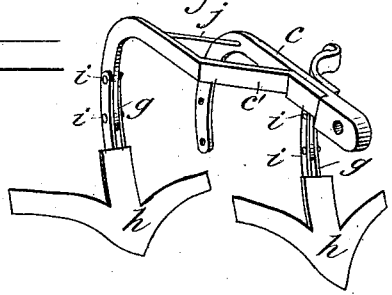

In the annexed drawings illustrating the invention, Figure 1 is a sectional side elevation of my improved cultivator attachments, showing the hoes or plows raised. Fig. 2 is a top view of the same. Fig. 3 is a sectional side view of the machine with rollers attached, the plows being lowered. Fig. 4 is a plan view of the pulverizing-rollers; and Figs. 5 and 6 represent perspective views of the cultivator-plows and their supporting devices.

Like letters of reference designate like parts.

A is the frame of the machine. B B are the carrying-wheels. C is the driver's seat, mounted upon a standard, D, at the rear part of a platform or foot-board, E; and F is the tongue or pole.

The longitudinal bars of the frame A support a transverse shaft, $a$, to which, at suitable intervals, are attached the two-part pendants $b\,b$, that are connected by bolts and nuts in any convenient manner. The lower ends of these pendants $b\,b$ are slotted or bifurcated, as shown in Fig. 5, for receiving the forward ends of the cultivator stocks or beams $c\,c'$, which are pivotally secured therein by means of a bolt or pin, $d$, that also connects the pendant to the clevis end of a brace-rod, $e$, the forward end of which is connected by an eyebolt, $f$, to the front cross-bar of the machine-frame.

It will be observed that the central stock or beam, $c$, is arranged parallel with the longitudinal bars of the frame A, while the side stocks or beams are bent or curved laterally to a distance corresponding with the width of the furrows, so as to bring the respective cultivators into different parallel lines. By varying the length of these stocks $c\,c'$, as shown, the cultivators are also made to follow each other along the opposite sides of the growing plants. The rear ends of the stocks $c\,c'$ are curved down, as shown, and to these downwardly-curved ends are attached the double or slotted shanks $g\,g$ of the cultivators $h\,h$ by means of pins or bolts $i\,i$, two of which are preferably used in each instance. One of these pins or bolts $i$ on each shank may be made of comparatively frail material, so as to break and permit the shank to turn back on the other as a pivot in case the hoe or cultivator-blade should strike against any obstruction. The hoe-blades are thus preserved from injury when brought forcibly in contact with unyielding substances. The central stock or beam, $c$, may carry two cultivators, as shown in Fig. 5, if desired. It is obvious that this central stock may be used alone or in connection with either one or two side beams, the several beams being bolted together at their forward ends, while their rear ends are connected by transverse rods $j\,j$. If desired, the rear cultivator-blade on the central beam, $c$, can be dispensed with, and the others replaced by larger cultivators, or by cotton-sweeps, as shown in Fig. 6.

To the central beam, $c$, in each set of cultivators, is pivoted a connecting rod or bar, $k$, the upper end of which is pivoted to the end of an arm, $l$, which is adjustably clutched to a rock-shaft, $m$, that is journaled to the frame of the machine. This rock-shaft carries a segment-gear, $n$, that meshes with a similar gear, $o$, on a lever, $p$, which is provided with a pawl, $q$, for engaging a ratchet, $r$, so that when the shaft $m$ has been partially rotated for the purpose of raising or lowering the cultivators, they can be securely held in the position to which they may have been adjusted. It will be seen that the cultivator-blades can thus be held to any desired depth in the soil, or they can be secured in an elevated position while drawing the machine from place to place, or while turning at the ends of the furrows.

It may be remarked that the frame of this machine is similar to that shown in Letters Patent granted to me February 22, 1881, No. 238,028, and July 4, 1882, No. 260,458, for improvements in cotton-choppers; and for that reason the present machine can be readily converted into a cotton-chopper by substituting either description of chopping mechanism illustrated in said patents, the choppers in that case being primarily actuated by the gearing G H I in a manner similar to that described in the patents above mentioned.

When the machine is used as a cultivator, plows, hoes, or shovels of various kinds can be attached to the stocks, according to the character of work required, and a roller or pulverizer, J, can also be attached to the rear end of the frame A, if desired. The sectional pulverizing-roller J is journaled in a frame, K, that is hinged or hooked to the rear end of the machine, as shown in Figs. 3 and 4. This frame K is provided with a transverse brace, bar, or rod, L, and carries at its rear end a steel blade or scraper, M, the edge of which is arranged in contact with the periphery of the roller for the purpose of removing the soil that collects thereon.

Having thus described my invention, what I claim as new, and desire to secure by Letters Patent, is—

1. The combination of the frame A, having a transverse rod or shaft, $a$, provided with laterally-adjustable pendants $b\ b$, the brace-rods $e\ e$, the cultivator-stocks $c\ c'$, carrying suitable blades, the rock-shaft $m$, having adjustable arms $l\ l$, and the rods or bars $k\ k$, for connecting said arms to the cultivator-stocks, whereby the latter may be raised or lowered, substantially as described.

2. The combination of the cultivator-frame A, having transverse shaft $a$, the two-part box pendants $b\ b$, mounted on said shaft, the brace-rods $e\ e$, and the adjustable cultivator stocks or beams $c\ c'$, pivoted in the slotted lower ends of the pendants $b$, and carrying cultivator-blades, substantially as described.

In testimony whereof I affix my signature in presence of two witnesses.

BURWELL J. CURRY.

Witnesses:
J. F. TURNER,
E. J. RUSSELL.